(12) United States Patent
Hirai et al.

(10) Patent No.: US 11,840,589 B2
(45) Date of Patent: Dec. 12, 2023

(54) PERFLUOROPOLYMER, LIQUID COMPOSITION, POLYMER ELECTROLYTE MEMBRANE, MEMBRANE ELECTRODE ASSEMBLY AND POLYMER ELECTROLYTE WATER ELECTROLYZER

(71) Applicant: AGC Inc., Tokyo (JP)

(72) Inventors: Takeshi Hirai, Tokyo (JP); Daisuke Jomuta, Tokyo (JP); Chikaya Tamitsuji, Tokyo (JP)

(73) Assignee: AGC Inc., Tokyo (JP)

( * ) Notice: Subject to any disclaimer, the term of this patent is extended or adjusted under 35 U.S.C. 154(b) by 184 days.

(21) Appl. No.: 17/331,912

(22) Filed: May 27, 2021

(65) Prior Publication Data
US 2021/0284771 A1    Sep. 16, 2021

Related U.S. Application Data

(63) Continuation of application No. PCT/JP2019/047943, filed on Dec. 6, 2019.

(30) Foreign Application Priority Data

Dec. 7, 2018  (JP) .................................. 2018-230213
Feb. 28, 2019 (JP) .................................. 2019-036638

(51) Int. Cl.

| | | |
|---|---|---|
| *C08F 214/26* | (2006.01) | |
| *C08F 216/14* | (2006.01) | |
| *C25B 9/23* | (2021.01) | |
| *C25B 1/04* | (2021.01) | |
| *C25B 13/08* | (2006.01) | |
| *H01M 8/1004* | (2016.01) | |
| *H01M 8/1023* | (2016.01) | |
| *H01M 8/1067* | (2016.01) | |
| *H01B 1/12* | (2006.01) | |
| *H01M 8/1039* | (2016.01) | |
| *H01M 8/1058* | (2016.01) | |
| *H01M 8/10* | (2016.01) | |

(52) U.S. Cl.
CPC .... *C08F 214/262* (2013.01); *C08F 216/1475* (2020.02); *C25B 1/04* (2013.01); *C25B 9/23* (2021.01); *C25B 13/08* (2013.01); *H01B 1/12* (2013.01); *H01M 8/1004* (2013.01); *H01M 8/1023* (2013.01); *H01M 8/1039* (2013.01); *H01M 8/1058* (2013.01); *H01M 8/1067* (2013.01); *H01M 2008/1095* (2013.01)

(58) Field of Classification Search
CPC .............................................. C08F 216/1475
See application file for complete search history.

(56) References Cited

U.S. PATENT DOCUMENTS

| | | | | |
|---|---|---|---|---|
| 3,282,875 | A * | 11/1966 | Connolly .............. | C07C 309/82 562/110 |
| 4,021,327 | A * | 5/1977 | Grot ........................ | B32B 27/12 204/296 |
| 2006/0099476 | A1* | 5/2006 | Watakabe ........... | H01M 8/1025 429/529 |
| 2006/0106252 | A1* | 5/2006 | Murata ................. | C07C 303/16 562/825 |
| 2008/0138685 | A1* | 6/2008 | Kaneko .............. | H01M 8/1039 429/492 |
| 2008/0146841 | A1* | 6/2008 | Kaneko ................. | C08J 5/2237 562/825 |
| 2009/0306233 | A1* | 12/2009 | Umemura ............. | C08J 5/2237 521/27 |
| 2011/0027688 | A1* | 2/2011 | Hommura ........... | H01M 8/1039 521/38 |
| 2013/0245219 | A1* | 9/2013 | Perry ................. | C08F 216/1475 526/243 |
| 2019/0131646 | A1* | 5/2019 | Saito ......................... | C08J 5/22 |
| 2019/0218675 | A1* | 7/2019 | Yamaki .................... | C25B 9/00 |
| 2019/0221874 | A1* | 7/2019 | Saito ..................... | C08F 216/16 |

(Continued)

FOREIGN PATENT DOCUMENTS

| | | |
|---|---|---|
| EP | 1734603 A1 | 12/2006 |
| JP | 11-21687 A | 1/1999 |
| JP | 2005-82749 A | 3/2005 |

(Continued)

OTHER PUBLICATIONS

Machine translation of Park et al., KR 10-2009-0032313 (Year: 2009).*
Mauritz et al, Property Control of (Perfluorinated Ionomer)/(Inorganic Oxide) Composites by Tailoring the Nanoscale Morphology, Final Report 1993-1996, Sep. 1996, pp. 1-31, available online at https://apps.dtic.mil/sti/citations/ADA316052 (Year: 1996).*
"Nafion(R) dispersion solution DE1021 CS type" available online at https://pubchem.ncbi.nlm.nih.gov/compound/61889 (accessed on Mar. 9, 2023), Mar. 2023 (Year: 2023).*

(Continued)

*Primary Examiner* — Harry D Wilkins, III
(74) *Attorney, Agent, or Firm* — Element IP, PLC (57) ABSTRACT

To provide a perfluoropolymer capable of producing an electrolyte membrane excellent in mechanical strength in high temperature environments; as well as a liquid composition, polymer electrolyte membrane, membrane electrode assembly and polymer electrolyte water electrolyzer, obtainable by using the perfluoropolymer.
The perfluoropolymer of the present invention contains perfluoromonomer units, does not substantially contain units having a halogen atom other than a fluorine atom, does not substantially contain units having a ring structure, and has acid-type sulfonic acid groups, wherein the perfluoromonomer units contain at least one type of units A selected from the group consisting of perfluorovinyl ether units and perfluoroallyl ether units; the ion exchange capacity is from 0.9 to 1.4 milliequivalent/gram dry resin; and the storage modulus at 120° C. is at least 100 MPa.

11 Claims, 1 Drawing Sheet

(56) References Cited

U.S. PATENT DOCUMENTS

2021/0301119 A1* 9/2021 Hirai .................. H01M 8/1039

FOREIGN PATENT DOCUMENTS

| KR | 10-2009-0032313 | * | 4/2009 |
| WO | WO 2017/221840 A1 | * | 12/2017 |
| WO | WO-2018061838 A1 | | 4/2018 |
| WO | WO 2019/045064 A1 | | 3/2019 |

OTHER PUBLICATIONS

Schalenbach et al, Gas Permeation through Nafion. Part. 1: Measurements, The Journal of Physical Chemistry C, vol. 119, No. 45, Oct. 2015, pp. 25145-25155 (Year: 2015).*

Broka et al, Oxygen and hydrogen permeation properties and water uptake of Nafion(R) 117 membrane and recast film for PEM fuel cell, Journal of Applied Electrochemistry, vol. 27, No. 2, Feb. 1997, pp. 117-123 (Year: 1997).*

Luo et al, Water, proton, and oxygen transport in high IEC, short side chain PFSA ionomer membranes: consequences of a frustrated network, Physical Chemistry Chemical Physics, vol. 13, No. 40, Oct. 2011, pp. 18055-18062 (Year: 2011).*

Guan et al, Origins of Water State and Ionic Cluster Morphology for High Proton Conductivity of Short Side-Chain Perfluorinated Sulfonic Acid Membranes, Chemistry of Materials, vol. 34, No. 17, Aug. 2022, pp. 7845-7857 (Year: 2022).*

Subianto et al, Physical and chemical modification routes leading to improved mechanical properties of perfluorosulfonic acid membranes for PEM fuel cells, Journal of Power Sources, vol. 223, Jul. 2013, pp. 216-230 (Year: 2013).*

Kusoglu et al, New Insights into Perfluorinated Sulfonic-Acid Ionomers, Chemical Reviews, vol. 117, No. 3, Jan. 2017, pp. 987-1104 (Year: 2017).*

Shi et al, Structure-Transport Relationship of Perfluorosulfonic-Acid Membranes in Different Cationic Forms, Electrochimica Acta, vol. 220, Dec. 2016, pp. 517-528 (Year: 2016).*

International Search Report dated Mar. 10, 2020 in PCT/JP2019/047943, filed on Dec. 6, 2019, 2 pages.

Kenneth A. Mauritz et al., State of Understanding of Nafion, Chem Rev., XP-002516304, 2004, 104, pp. 4535-4585.

* cited by examiner

PERFLUOROPOLYMER, LIQUID COMPOSITION, POLYMER ELECTROLYTE MEMBRANE, MEMBRANE ELECTRODE ASSEMBLY AND POLYMER ELECTROLYTE WATER ELECTROLYZER

TECHNICAL FIELD

The present invention relates to a perfluoropolymer, a liquid composition, a polymer electrolyte membrane, a membrane electrode assembly and a polymer electrolyte water electrolyzer.

BACKGROUND ART

The polymer electrolyte membrane contained in the membrane electrode assembly is obtainable, for example, by forming a polymer having acid-type sulfonic acid groups into a membrane. As the polymer having such acid-type sulfonic acid groups, a perfluoropolymer having units represented by —[$CF_2$—$CF(OCF_2CF_2SO_3H)$]— is disclosed in Examples of Patent Document 1.

The membrane electrode assembly containing the polymer electrolyte membrane can be applied to various uses. For example, it is applicable to, in addition to a polymer electrolyte fuel cell as described in Patent Document 1, a polymer electrolyte water electrolyzer as described in Patent Document 2.

PRIOR ART DOCUMENTS

Patent Documents

Patent Document 1: JP-A-2005-082749
Patent Document 2: JP-A-H11-021687

DISCLOSURE OF INVENTION

Technical Problem

The use for polymer electrolyte water electrolysis is being studied from the viewpoint of power-to-gas, that is, conversion of surplus electric power to gas for storage and utilization. Increasing the operating temperature is effective for improving the energy conversion efficiency of polymer electrolyte water electrolysis. Further, from the viewpoint of effective utilization of hydrogen generated by power-to-gas, it is required to increase the pressure of hydrogen generated from the polymer electrolyte water electrolyzer. From these demands, there is a demand for a water electrolyzer that can be operated even at a high temperature of at least 100° C. and high pressure, and for a material that can realize it. In the case of the membrane electrode assembly used in the polymer electrolyte water electrolyzer as described in Patent Document 2, a large pressure may be applied to the membrane electrode assembly partitioning an anode chamber and a cathode chamber, as compared with the membrane electrode assembly used in a polymer electrolyte fuel cell. Further, as described above, the water electrolyzer may be operated by using heated water. Therefore, the membrane electrode assembly is required to have excellent mechanical strength even in a high temperature environment.

The present inventors have evaluated the electrolyte membrane obtained by using the perfluoropolymer having the above-mentioned units as described in Patent Document 1, and they have found that there is room for improvement in the mechanical strength in a high temperature environment.

In view of the above circumstances, it is an object of the present invention to provide a perfluoropolymer capable of producing an electrolyte membrane excellent in mechanical strength in a high temperature environment, as well as a liquid composition, a polymer electrolyte membrane, a membrane electrode assembly and a polymer electrolyte water electrolyzer, obtainable by using the perfluoropolymer.

Solution to Problem

As a result of diligent studies on the above problem, the present inventors have found that an electrolyte membrane excellent in mechanical strength in a high temperature environment can be produced if a perfluoropolymer is used which contains predetermined repeating units, of which the ion exchange capacity is within a predetermined range, and of which the storage modulus at 120° C. is at least 100 MPa, and thus have arrived at the present invention.

That is, the present inventors have found it possible to solve the above problem by the following construction.

[1] A perfluoropolymer containing perfluoromonomer units, not substantially containing units having a halogen atom other than a fluorine atom, not substantially containing units having a ring structure, and having acid-type sulfonic acid groups, wherein the perfluoromonomer units contain at least one type of units A selected from the group consisting of perfluorovinyl ether units and perfluoroallyl ether units, the ion exchange capacity is from 0.9 to 1.4 milliequivalent/gram dry resin, and the storage modulus at 120° C. is at least 100 MPa.

[2] The perfluoropolymer according to [1], of which the hydrogen gas permeation coefficient under the conditions of a temperature of 80° C. and a relative humidity of 10% is at most $2.7 \times 10^{-9}$ $cm^3 \cdot cm/(s \cdot cm^2 \cdot cmHg)$.

[3] The perfluoropolymer according to [1] or [2], which is a perfluoropolymer obtainable by converting precursor groups of a precursor polymer in which the acid-type sulfonic acid groups are in the form of the precursor groups, into the acid-type sulfonic acid groups, wherein the TQ value of the precursor polymer is at least 220° C.

[4] The perfluoropolymer according to any one of [1] to [3], wherein the content of units A is from 4 to 19 mol % to all units in the perfluoropolymer.

[5] The perfluoropolymer according to any one of [1] to [4], wherein the perfluoroallyl ether units are units represented by the formula A-1 given later; and in the formula A-1 given later, $R^{F1}$ and $R^{F2}$ are each independently a $C_{1-3}$ perfluoroalkylene group.

[6] The perfluoropolymer according to any one of [1] to [5], wherein the perfluoromonomer units further contain tetrafluoroethylene units.

[7] A liquid composition comprising the perfluoropolymer as defined in any one of [1] to [6] and a liquid medium.

[8] A polymer electrolyte membrane comprising the perfluoropolymer as defined in any one of [1] to [6].

[9] The polymer electrolyte membrane according to [8], which further contains a reinforcing material.

[10] A membrane electrode assembly comprising an anode having a catalyst layer containing a catalyst and a polymer having ion exchange groups, a cathode having a catalyst layer containing a catalyst and a polymer having ion exchange groups, and the polymer electrolyte membrane as defined in [8] or [9], disposed between the anode and the cathode.

[11] The membrane electrode assembly according to [10], wherein at least one of the polymer having ion exchange groups contained in the anode and the polymer having ion exchange groups contained in the cathode, is the perfluoropolymer as defined in any one of [1] to [6].

[12] A polymer electrolyte water electrolyzer comprising the membrane electrode assembly as defined in [10] or [11].

Advantageous Effects of Invention

According to the present invention, it is possible to provide a perfluoropolymer capable of producing an electrolyte membrane excellent in mechanical strength in a high temperature environment, as well as a liquid composition, a polymer electrolyte membrane, a membrane electrode assembly and a polymer electrolyte water electrolyzer, obtainable by using the perfluoropolymer.

DESCRIPTION OF EMBODIMENTS

The following definitions of terms apply throughout the specification and claims unless otherwise noted.

An "ion exchange group" is a group capable of exchanging at least some of the ions contained in this group with other ions, and, for example, the following sulfonic acid-type functional group and carboxylic acid-type functional group may be mentioned.

A "sulfonic acid-type functional group" is a general term for an acid-type sulfonic acid group (—$SO_3H$) and a salt-type sulfonic acid group (—$SO_3M^2$, where $M^2$ is a metal ion or a quaternary ammonium cation).

A "carboxylic acid-type functional group" is a general term for an acid-type carboxylic acid group (—COOH) and a salt-type carboxylic acid group (—$COOM^1$, where $M^1$ is a metal ion or a quaternary ammonium cation).

"Not substantially containing units" means that the content of the units is at most 1 mol % to all units in the polymer containing the units.

The productivity index (Rp) value of a polymer indicates the amount of the polymer (g) produced per 100 g of the total amount of monomers charged before and during the polymerization, and per hour of the polymerization time.

A "unit" in a polymer means an atomic group derived from one molecule of a monomer, which is formed by polymerization of the monomer. The unit may be an atomic group directly formed by the polymerization reaction, or may be an atomic group in which a part of the atomic group is converted into another structure by processing the polymer obtained by the polymerization reaction. In addition, the structural unit derived from an individual monomer may be described by adding "unit" to the monomer name.

A unit represented by the formula A-1 is referred to as a unit A-1. Units represented by other formulas are also referred to in the same manner.

[Perfluoropolymer]

The perfluoropolymer of the present invention is a perfluoropolymer (hereinafter referred to also as "polymer H") which contains perfluoromonomer units, substantially does not contain units having a halogen atom other than a fluorine atom, substantially does not contain units having a ring structure, and has acid-type sulfonic acid groups, wherein the perfluoromonomer units contain at least one type of units A selected from the group consisting of perfluorovinyl ether units and perfluoroallyl ether units, the ion exchange capacity is from 0.9 to 1.4 milliequivalent/gram dry resin and the storage modulus at 120° C. is at least 100 MPa.

According to the polymer H, it is possible to produce an electrolyte membrane excellent in mechanical strength in a high temperature environment.

The perfluoromonomer units contain units A. As described above, the units A means at least one type of units selected from the group consisting of perfluorovinyl ether units and perfluoroallyl ether units.

The units A may contain one or both of perfluorovinyl ether units and perfluoroallyl ether units, but they preferably contain perfluoroallyl ether units from the viewpoint of easy synthesis, and they are particularly preferably perfluoroallyl ether units.

The units A may have ion exchange groups or may not have ion exchange groups, but from such a viewpoint that it becomes easy to adjust the ion exchange capacity of the electrolyte membrane to be in the range as described later, they preferably have ion exchange groups, more preferably have sulfonic acid-type functional groups, and particularly preferably have acid-type sulfonic acid groups.

When the units A have ion exchange groups, the number of ion exchange groups in a unit is preferably two or more, since it is thereby easy to further increase the ion exchange capacity of the electrolyte membrane, and particularly preferably two, since synthesis is thereby easy.

The units A contained in the polymer H may be of one type or of two or more types having different structures.

As the perfluoroallyl ether units, units A-1 are preferred, since the storage modulus of the polymer H at 120° C. is further improved and an electrolyte membrane more excellent in mechanical strength in a high temperature environment can be obtained.

(A-1)

As the perfluorovinyl ether units, units A-2 or units A-3 are preferred, since the storage modulus of the polymer H at 120° C. is further improved and an electrolyte membrane more excellent in mechanical strength in a high temperature environment can be obtained.

(A-2)

(A-3)

In the formulas A-1 to A-3, $R^{F1}$ and $R^{F2}$ are each independently a $C_{1-3}$ perfluoroalkylene group.

Specific examples of $R^{F1}$ and $R^{F2}$ are —$CF_2$—, —$CF_2CF_2$—, —$CF(CF_3)$—, —$CF_2CF_2CF_2$—, —$CF(CF_2CF_3)$—, —$CF(CF_3)CF_2$—, —$CF_2CF(CF_3)$— and —$C(CF_3)(CF_3)$—.

From such a viewpoint that raw material is inexpensive, the production is easy and the ion exchange capacity of the polymer H can be made higher, $R^{F1}$ and $R^{F2}$ are each independently, preferably a $C_1$ or $C_2$ perfluoroalkylene group. In the case of 2 carbon atoms, a straight chain is preferred. Specifically, —$CF_2$—, —$CF_2CF_2$— or —$CF(CF_3)$— are preferred, —$CF_2$— or —$CF_2CF_2$— is more preferred, —$CF_2$— is particularly preferred.

In the formula A-2, $R^{F3}$ is a $C_{1-6}$ perfluoroalkylene group.

Specific examples of $R^{F3}$ are —$CF_2$—, —$CF_2CF_2$—, —$CF(CF_3)$—, —$CF_2CF_2CF_2$—, —$CF(CF_2CF_3)$—, —$CF(CF_3)CF_2$—, —$CF_2CF(CF_3)$—, —$C(CF_3)(CF_3)$— and —$CF_2CF(CF_3)OCF_2CF(CF_3)$—.

From such a viewpoint that raw material is inexpensive, the production is easy and the ion exchange capacity of the polymer H can be made higher, $R^{F3}$ is preferably a $C_{1-3}$ perfluoroalkylene group. Specifically, —$CF_2$—, —$CF_2CF_2$— or —$CF_2CF(CF_3)$— are preferred, and —$CF_2CF(CF_3)$— is particularly preferred.

In the formula A-2, m is 0 or 1.

The perfluoromonomer units may contain units other than the units A. The units other than the units A may be perfluoromonomer units not having an ion exchange group or its precursor group.

Specific examples of the perfluoromonomer units not having an ion exchange group or its precursor group may be tetrafluoroethylene (hereinafter referred to also as "TFE") units and hexafluoropropylene units, and TFE units are preferred from such a viewpoint that the storage modulus of the polymer H at 120° C. is further improved, an electrolyte membrane more excellent in mechanical strength in a high temperature environment can be obtained, a polymer having a higher molecular weight can be obtained, and an electrolyte membrane more excellent in heat resistance can be obtained.

The content of the units A is preferably from 4 to 19 mol % to all units of the polymer H.

The lower limit value of the content of the units A is preferably 4 mol %, more preferably 4.5 mol %, particularly preferably 5 mol %, to all units in the polymer H, from such a viewpoint that it becomes easy to adjust the ion exchange capacity of the electrolyte membrane to be in the range as described later.

The upper limit value of the content of the units A is preferably 19 mol %, more preferably 15 mol %, particularly preferably 10 mol %, to all units in the polymer H, from such a viewpoint that the storage modulus of the polymer H at 120° C. is further improved, and an electrolyte membrane more excellent in mechanical strength in a high temperature environment can be obtained.

In a case where perfluoromonomer units not having an ion exchange group or its precursor group are contained, the content thereof in the polymer H is preferably from 81 to 96 mol %, more preferably from 85 to 95.5 mol %, particularly preferably from 90 to 95 mol %, to all units in the polymer H, from such a viewpoint that it becomes easy to adjust the ion exchange capacity and the storage modulus at 120° C. to be in the ranges as described later. Such a content is particularly suitable when the perfluoromonomer units are TFE units.

The polymer H does not substantially contain units having a halogen atom other than a fluorine atom (hereinafter referred to also as "units X1"). As a result, the chain transfer reaction is less likely to occur when the monomer is polymerized to produce the polymer H, and the amount of an oligomer generated during the production is small.

Specific examples of the units X1 may be chlorotrifluoroethylene units, bromotrifluoroethylene units, iodotrifluoroethylene units and dichlorodifluoroethylene units.

The polymer H preferably does not contain the units X1 (0 mol %).

The polymer H substantially does not contain units having a ring structure (hereinafter referred to also as "units X2"). As a result, the polymer H is suppressed from becoming brittle and the toughness of the polymer H is increased, whereby the mechanical strength of the electrolyte membrane obtainable by using the polymer H is excellent.

The ring structure may be an aliphatic hydrocarbon ring, an aliphatic heterocyclic ring, an aromatic hydrocarbon ring, and an aromatic heterocyclic ring. The ring structure may be present in the main chain or in the side chain.

Specific examples of the units X2 may be the units having a cyclic ether structure as described in Japanese Patent No. 4997968 and Japanese Patent No. 5454592.

The polymer H preferably does not contain the units X2 (0 mol %).

It is preferred that the polymer H does not substantially contain units having a crosslinked structure composed of a covalent bond (hereinafter referred to also as "units X3"). This makes it easier for the polymer H to be dissolved or dispersed in the liquid medium, whereby when an electrolyte membrane is formed using the liquid composition containing the polymer H and the liquid medium, the electrolyte membrane can be thinned.

The crosslinked structure composed of a covalent bond is a structure in which a monomer having a crosslinkable group (for example, a vinyl group, a perfluorovinyl group, etc.) that can be crosslinked by a covalent bond is polymerized, and then the crosslinkable group is crosslinked by the covalent bond, or a structure obtainable by cross-linking a monomer having a crosslinkable group that can be crosslinked by a covalent bond at the same time as the polymerization reaction.

As a specific example of the units X3, there may be mentioned units having a structure in which after polymerizing the compounds of the formulas 8 to 15 (compounds having two crosslinkable groups) as described in JP-A-2001-176524, crosslinkable groups not used in the polymerization are crosslinked by covalent bonds.

It is more preferred that the polymer H does not contain the units X3 (0 mol %).

<Physical Properties>

The ion exchange capacity of the polymer H is from 0.9 to 1.4 milliequivalent/gram dry resin, preferably from 1.0 to 1.35 milliequivalent/gram dry resin, particularly preferably from 1.05 to 1.3 milliequivalent/gram dry resin. When the ion exchange capacity is at least the lower limit value in the above range, the electrolysis voltage can be reduced when used as a polymer electrolyte membrane of a polymer electrolyte water electrolyzer. When the ion exchange capacity is at most the upper limit value in the above range, the mechanical strength is excellent when made into an electrolyte membrane.

The "ion exchange capacity" of the polymer H is obtainable by the method as described in Examples given later.

The conductivity of the polymer H at a temperature of 80° C. and a relative humidity of 50% RH is preferably at least 0.03 S/cm, more preferably at least 0.04 S/cm, further preferably at least 0.05 S/cm. When the conductivity is at least the above lower limit value, the electrolysis voltage can be made smaller when made into a polymer electrolyte membrane of a polymer electrolyte water electrolyzer. The higher the conductivity, the better, and the upper limit is not limited.

The "conductivity" of the polymer H is obtainable in the same manner as the method for measuring the conductivity in Examples as described later, except that the measurement target is changed to a membrane made of the polymer H (membrane thickness 25 μm).

When the storage modulus of the polymer H at 120° C. is high, the mechanical strength of an electrolyte membrane obtainable by using the polymer H in a high temperature environment is excellent.

Specifically, the storage modulus of the polymer H at 120° C. is at least 100 MPa, preferably at least 120 MPa, more preferably at least 140 MPa, particularly preferably at least 145 MPa, from the viewpoint of obtaining an electrolyte membrane excellent in mechanical strength in a high temperature environment.

The upper limit value of the storage modulus of the polymer H at 120° C. is preferably 300 MPa, more preferably 260 MPa, particularly preferably 220 MPa, since the electrolysis voltage can be made smaller when made into a polymer electrolyte membrane of a polymer electrolyte water electrolyzer.

The "storage modulus at 120° C." of the polymer H is obtainable in the same manner as the method for measuring the storage modulus in Examples as described later, except that the measurement target is changed to a membrane made of the polymer H (membrane thickness: 50 μm).

The softening temperature of the polymer H is preferably from 140 to 185° C., more preferably from 150 to 175° C., particularly preferably from 155 to 165° C. When the softening temperature is at least the lower limit value, an electrolyte membrane more excellent in mechanical strength in a high temperature environment can be obtained.

The "softening temperature" of the polymer H is obtainable in the same manner as the method for measuring the softening temperature in Examples as described later, except that the measurement target is changed to a membrane made of the polymer H (membrane thickness: 50 μm).

The hydrogen gas permeation coefficient of the polymer H under the conditions of a temperature of 80° C. and a relative humidity of 10% is preferably at most $2.7 \times 10^{-9}$ cm$^3$·cm/(s·cm$^2$·cmHg), more preferably at most $2.0 \times 10^{-9}$ cm$^3$·cm/(s·cm$^2$·cmHg), further preferably at most $1.6 \times 10^{-9}$ cm$^3$·cm/(s·cm$^2$·cmHg), still more preferably at most $1.4 \times 10^{-9}$ cm$^3$·cm/(s·cm$^2$·cmHg), specially preferably at most $1.2 \times 10^{-9}$ cm$^3$·cm/(s·cm$^2$·cmHg), particularly preferably at most $1.0 \times 10^{-9}$ cm$^3$·cm/(s·cm$^2$·cmHg), since the polymer H is excellent in hydrogen gas barrier properties.

The hydrogen gas permeation coefficient of the polymer H under the conditions of a temperature of 80° C. and a relative humidity of 10% is preferably at least $1.0 \times 10^{-12}$ cm$^3$·cm/(s·cm$^2$·cmHg), particularly preferably at least $1.0 \times 10^{-11}$ cm$^3$·cm/(s·cm$^2$·cmHg), from the viewpoint of maintaining a high conductivity of the polymer H.

The "hydrogen gas permeation coefficient" of the polymer H is obtainable in the same manner as the method for measuring the hydrogen gas permeation coefficient in Examples as described later, except that the measurement target is changed to a membrane made of the polymer H (membrane thickness 100 μm).

<Method for producing polymer H>

An example of a method for producing the polymer H may be a method of converting precursor groups of a precursor polymer (hereinafter referred to also as "polymer F") in which acid-type sulfonic acid groups in the polymer H are the precursor groups (specifically groups represented by —SO$_2$F), into the acid-type sulfonic acid groups (—SO$_3^-$H$^+$).

A specific example of the method of converting the groups represented by —SO$_2$F, which are precursor groups, into acid-type sulfonic acid groups, may be a method in which the groups represented by —SO$_2$F of the polymer F are hydrolyzed to form salt-type sulfonic acid groups, and the salt-type sulfonic acid groups are converted to an acid-type to form acid-type sulfonic acid groups.

(Polymer F)

The polymer F is preferably a perfluoropolymer containing perfluoromonomer units, not substantially containing units having a halogen atom other than a fluorine atom, not substantially containing units having a ring structure, and having groups represented by —SO$_2$F.

Further, the polymer F more preferably does not substantially contain the units X3, and particularly preferably does not contain the units X3 (0 mol %).

The perfluoromonomer units contained in the polymer F preferably contain at least one type of units a selected from the group consisting of perfluorovinyl ether units and perfluoroallyl ether units.

The units a may contain one or both of the perfluorovinyl ether units and the perfluoroallyl ether units, but from such a viewpoint that synthesis is easy, it is preferred that they contain the perfluoroallyl ether units, and it is particularly preferred that they are the perfluoroallyl ether units.

The units to be contained in the units a may have a precursor group of an ion exchange group or may not have a precursor group of an ion exchange group, but preferably have a precursor group of an ion exchange group, and particularly preferably have a precursor group (specifically a group represented by —SO$_2$F) of a sulfonic acid-type functional group.

A specific example of the perfluorovinyl ether units in the units a, may be units in which acid-type sulfonic acid groups of the perfluorovinyl ether units in the units A as described above, are changed to groups represented by —SO$_2$F.

The units a-1 are preferred as the perfluoroallyl ether units in the units a.

(a-1)

$R^{F1}$ and $R^{F2}$ in the formula a-1 have the same meanings as $R^{F1}$ and $R^{F2}$ in the formula A-1, respectively.

The perfluoromonomer units in the units a may contain units other than the units a. Specific examples of units other than the units a may be perfluoromonomer units not having an ion exchange group or its precursor group.

Specific examples of the perfluoromonomer units not having an ion exchange group or its precursor group, the units having a ring structure, and the units having a cross-linked structure composed of a covalent bond, are the same as those of the polymer H.

The contents of the respective units in the polymer F are preferably the same as the contents of the respective units in the polymer H.

The TQ value of the polymer F is preferably at least 220° C., more preferably at least 230° C., further preferably at least 240° C. When the TQ value is at least the above lower limit value, the polymer H having a sufficient molecular weight can be obtained, whereby the mechanical strength of an electrolyte membrane is more excellent. The TQ value of the polymer F is preferably at most 500° C., more preferably at most 450° C. When the TQ value is at most the upper limit value, the solubility or dispersibility of the polymer H in the liquid medium is improved, whereby a liquid composition can be easily prepared. The TQ value is an index for the molecular weight of the polymer F.

The "TQ value" of the polymer F is obtainable by the method described in Examples given later.

In the method for producing a perfluoropolymer of the present invention, the Rp value, which is the amount of the perfluoropolymer produced per 100 g of the total amount of monomers charged before and during the polymerization and per hour of the polymerization time, is preferably at least 1.0, more preferably at least 2.0, further preferably at least 3.0, particularly preferably at least 4.5.

<Application>

Specific examples of the application of the polymer H may be an electrolyte of a polymer electrolyte membrane to be used in a polymer electrolyte water electrolyzer, a polymer electrolyte fuel cell, etc. Among these, it is suitable as an electrolyte for a polymer electrolyte membrane for a polymer electrolyte water electrolyzer, since the mechanical strength is excellent and the ion exchange capacity is within the above-mentioned range.

Further, the polymer H is also preferably used as a polymer having ion exchange groups, contained in a catalyst layer in a membrane electrode assembly.

[Liquid Composition]

The liquid composition of the present invention contains a polymer H and a liquid medium. The polymer H in the liquid composition may be dispersed in the liquid medium or may be dissolved in the liquid medium.

Since the liquid composition of the present invention contains the polymer H, the electrolyte membrane obtained by using the liquid composition of the present invention is excellent in mechanical strength in a high temperature environment.

Specific examples of the liquid medium may be water and an organic solvent. As the liquid medium, only water may be used, only an organic solvent may be used, or a mixed solvent of water and an organic solvent may be used, but it is preferred to use a mixed solvent of water and an organic solvent.

When water is contained as the liquid medium, the dispersibility or solubility of the polymer H in the liquid medium is likely to be improved. When an organic solvent is contained as the liquid medium, a hardly breakable electrolyte membrane can be easily obtained.

As the organic solvent, an alcohol having from 1 to 4 carbon atoms is preferred, since a hardly breakable electrolyte membrane can thereby be easily obtained.

The alcohol having from 1 to 4 carbon atoms may, for example, be methanol, ethanol, 1-propanol, 2-propanol, 1-butanol, 2,2,2-trifluoroethanol, 2,2,3,3,3-pentafluoro-1-propanol, 2,2,3,3-tetrafluoro-1-propanol, 1,1,1,3,3,3-hexafluoro-2-propanol or 3,3,3-trifluoro-1-propanol.

As the organic solvent, one type may be used alone, or two or more types may be used in combination.

When the liquid medium is a mixed solvent of water and an organic solvent, the content of water is preferably from 10 to 99 mass %, particularly preferably from 20 to 99 mass %, to the total mass of the liquid medium.

When the liquid medium is a mixed solvent of water and an organic solvent, the content of the organic solvent is preferably from 1 to 90 mass %, particularly preferably from 1 to 80 mass %.

When the contents of water and the organic solvent are within the above ranges, a polymer electrolyte membrane excellent in dispersibility or solubility in the liquid medium and being hardly breakable can be easily obtained.

The content of the polymer H is preferably from 1 to 50 mass %, particularly preferably from 3 to 30 mass %, to the total mass of the liquid composition. When it is at least the lower limit value in the above range, a thick membrane can be stably obtained at the time of membrane formation. When it is at most the upper limit value in the above range, the viscosity of the liquid composition becomes proper.

The liquid composition may contain at least one type of metal, a metal compound, or a metal ion selected from the group consisting of cerium and manganese in order to further improve the durability of the electrolyte membrane to be made from the liquid composition.

[Polymer Electrolyte Membrane]

The polymer electrolyte membrane of the present invention contains a polymer H. Since the polymer electrolyte membrane of the present invention contains the polymer H, it is excellent in mechanical strength in a high temperature environment.

The membrane thickness of the polymer electrolyte membrane is preferably from 5 to 200 μm, particularly preferably from 10 to 130 μm. When it is at least the lower limit value in the above range, sufficient hydrogen gas barrier properties can be secured. When it is at most the upper limit value in the above range, the membrane resistance can be made to be sufficiently small.

The polymer electrolyte membrane may be reinforced with a reinforcing material. Specific examples of the reinforcing material may be porous materials, fibers, woven fabrics and non-woven fabrics.

The reinforcing material is preferably constituted by a material selected from the group consisting of polytetrafluoroethylene (hereinafter referred to also as "PTFE"), a tetrafluoroethylene-perfluoroalkyl vinyl ether copolymer (hereinafter referred to also as "PFA"), polyetheretherketone (hereinafter referred to also as "PEEK"), and polyphenylene sulfide (hereinafter referred to also as "PPS").

In order to further improve durability, the polymer electrolyte membrane may contain at least one type of metal, a metal compound, or a metal ion selected from the group consisting of cerium and manganese. Cerium and manganese decompose hydrogen peroxide, hydroxyl radicals and hydroperoxyl radicals, which are the causative substances that cause deterioration of the polymer electrolyte membrane.

The polymer electrolyte membrane may contain silica or a heteropolyacid (e.g. zirconium phosphate, phosphomolybdic acid or phosphotungstic acid), as a water retention agent to prevent drying.

An example of a method for producing a polymer electrolyte membrane may be a method (cast method) in which the above-mentioned liquid composition is applied to the surface of a base film or a catalyst layer and then dried.

As an example of the production method when the polymer electrolyte membrane contains a reinforcing material, there is a method of impregnating the reinforcing material with the above-mentioned liquid composition and drying it.

It is preferred to conduct heat treatment in order to stabilize the polymer electrolyte membrane. The heat treatment temperature is preferably from 130 to 200° C., although it depends on the type of the polymer H. When the heat treatment temperature is at least 130° C., the water content of the polymer H becomes proper. When the heat treatment temperature is at most 200° C., the thermal decomposition of sulfonic acid groups is suppressed, whereby the excellent conductivity of the polymer electrolyte membrane can be maintained.

The polymer electrolyte membrane may be treated with a hydrogen peroxide solution, as the case requires.

[Membrane Electrode Assembly]

The membrane electrode assembly of the present invention comprises an anode having a catalyst layer containing a catalyst and a polymer having ion exchange groups, a cathode having a catalyst layer containing a catalyst and a polymer having ion exchange groups, and the above-mentioned polymer electrolyte membrane disposed between the anode and the cathode.

Figure 1:
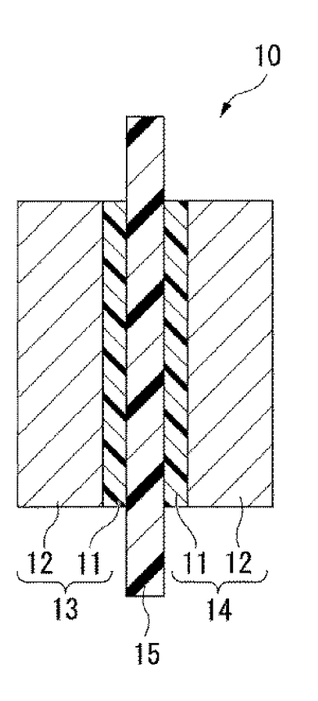
FIG. 1 is a schematic cross-sectional view showing an example of the membrane electrode assembly of the present invention.

Hereinafter, an example of the membrane electrode assembly of the present invention will be described with reference to the drawing.

FIG. 1 is a schematic cross-sectional view showing an example of the membrane electrode assembly of the present invention. The membrane electrode assembly 10 comprises an anode 13 having a catalyst layer 11 and a gas diffusion layer 12, a cathode 14 having a catalyst layer 11 and a gas diffusion layer 12, and a polymer electrolyte membrane 15 to be disposed in a state in contact with the catalyst layers 11 between the anode 13 and the cathode 14.

Specific examples of the catalyst contained in the catalyst layer 11 may be a supported catalyst in which a platinum, a platinum alloy, or a catalyst containing platinum having a core-shell structure, is supported on a carbon carrier, an iridium oxide catalyst, an alloy containing iridium oxide, and a catalyst containing iridium oxide having a core-shell structure. The carbon carrier may be carbon black powder.

The polymer having ion exchange groups contained in the catalyst layer 11 may be a fluoropolymer having ion exchange groups, and it is also preferred to use the above-mentioned polymer H.

When the above-mentioned polymer H is used as the polymer having ion exchange groups, contained in the catalyst layer 11, at least one of the polymer having ion exchange groups, contained in the catalyst layer of the anode and the polymer having ion exchange groups, contained in the catalyst layer of the cathode, may be the polymer H.

The gas diffusion layer 12 has a function to uniformly diffuse the gas in the catalyst layer and a function as a current collector. Specific examples of the gas diffusion layer may be carbon paper, carbon cloth, carbon felt, and a porous material made of titanium (specifically a sintered body of titanium particles or fibers).

In order to prevent adhesion of the generated gas, the gas diffusion layer may be subjected to water-repellent or hydrophilizing treatment with PTFE or the like, or may be hydrophilized by a polymer having ion exchange groups or the like.

Although the gas diffusion layer 12 is contained in the membrane electrode assembly in FIG. 1, the gas diffusion layer is an arbitrary member and may not be contained in the membrane electrode assembly.

The polymer electrolyte membrane 15 is a polymer electrolyte membrane containing the above-mentioned polymer H.

As a method for producing a membrane electrode assembly, for example, a method of forming catalyst layers on a polymer electrolyte membrane and further sandwiching the obtained assembly with gas diffusion layers, and a method of forming a catalyst layer on a gas diffusion layer to obtain electrodes (anode and cathode), and sandwiching a polymer electrolyte membrane between the electrodes.

Further, the method for producing a catalyst layer may be a method in which a coating liquid for forming a catalyst layer is applied to a predetermined position and dried as the case requires. The coating liquid for forming a catalyst layer is a liquid in which a polymer having ion exchange groups and a catalyst are dispersed in a dispersion medium.

[Polymer Electrolyte Water Electrolyzer]

The polymer electrolyte water electrolyzer of the present invention contains the above-mentioned membrane electrode assembly.

Since the polymer electrolyte water electrolyzer of the present invention contains the above-mentioned membrane electrode assembly, it is excellent in durability.

The polymer electrolyte water electrolyzer may have a known construction other than using the above-mentioned membrane electrode assembly, and, for example, there may be mentioned an embodiment having an electrolytic cell for installing the membrane electrode assembly, a water supply means for supplying water to the anode side, a water recovery means for recovering surplus water, a gas recovery means for recovering generated hydrogen gas, a power supply unit for applying a voltage, etc.

In the polymer electrolyte water electrolyzer, a voltage is applied between the anode and the cathode of the membrane electrode assembly, and at the same time, water is supplied to the anode side. The water supplied to the anode side is decomposed to generate hydrogen ions and oxygen. The generated hydrogen ions move to the cathode side via the polymer electrolyte membrane and combine with electrons on the cathode side to generate hydrogen.

EXAMPLES

Hereinafter, the present invention will be described in detail with reference to Examples. Ex. 3-1 is Example of the present invention, and Ex. 5-1 to Ex. 5-2 are Comparative Examples. However, the present invention is not limited to these Examples. The blending amounts of the respective components in the Tables described later indicate a mass standard.

In the following, "polymer H" is a general term for perfluoropolymers according to Examples, and their precursor polymers are generically referred to as "polymer F". Further, "polymer H'" is a general term for perfluoropolymers according to Comparative Examples, and their precursor polymers are generically referred to as "polymer F'".

[$^1$H-NMR]

$^1$H-NMR was measured under the conditions of frequency: 300.4 MHz and chemical shift standard: tetramethylsilane. Unless otherwise specified, $CD_3CN$ was used as the solvent. The quantification of a product was carried out from the analysis result of $^1$H-NMR and the amount of the internal standard sample (1,3-bis (trifluoromethyl)benzene) added.

[$^{19}$F-NMR]

$^{19}$F-NMR was measured under the conditions of frequency: 282.7 MHz, solvent: $CD_3CN$, and chemical shift standard: $CFCl_3$. The quantification of a product was carried out from the analysis result of $^{19}$F-NMR and the amount of the internal standard sample (1,3-bis (trifluoromethyl) benzene) added.

[13C-NMR]

$^{13}$C-NMR was measured under the conditions of frequency: 75.5 MHz and chemical shift standard: tetramethylsilane. Unless otherwise specified, CD$_3$CN was used as the solvent.

[Yield]

Yield means the yield of the reaction step×the yield of the purification step. The reaction yield means the yield of the reaction step before purifying the target product, which does not include the loss of the purification step.

[Ion Exchange Capacity]

A membrane of the polymer F or polymer F' was vacuum dried at 120° C. for 12 hours. After measuring the mass of the membrane of the polymer after drying, the membrane of the polymer was immersed in a 0.85 mol/g sodium hydroxide solution (solvent: water/methanol=10/90 (mass ratio)) at 60° C. for at least 72 hours to hydrolyze groups represented by —SO$_2$F. The ion exchange capacity of the polymer F or polymer F' was obtained by back titrating the sodium hydroxide solution after the hydrolysis with 0.1 mol/L hydrochloric acid. In the present specification, the ion exchange capacity of the polymer H or polymer H' is described as being the same as the ion exchange capacity to be measured by using the polymer F or polymer F' as its precursor.

[Proportions of the Respective Units]

The proportions of the respective units in the polymer F or polymer F' were calculated from the ion exchange capacity of the polymer F or polymer F'.

The proportions of the respective units in the polymer H or polymer H' are the same as the proportions of the corresponding respective units in the polymer F or polymer F'.

[Storage Modulus, Softening Temperature]

With respect to a polymer electrolyte membrane (membrane thickness 50 μm), using a dynamic viscoelasticity measuring device (manufactured by IT Keisoku Seigyo K.K., DVA-225), the dynamic viscoelasticity measurement was carried out under the conditions of sample width: 5.0 mm, gripping space length: 15 mm, measurement frequency: 1 Hz, temperature rise rate: 2° C./min and tension mode. From the ratio (E"/E') of loss modulus E" to storage modulus E', tan δ (tangent loss) was calculated, and a tan δ-temperature curve was prepared. The value obtained by reading the peak temperature between −100 and 200° C. from the tan δ-temperature curve was taken as the softening temperature of the polymer H or polymer H'. Further, a storage modulus E'-temperature curve was prepared, and the value obtained by reading the storage modulus at 120° C. was taken as the storage modulus of the polymer H or polymer H' at 120° C. The standard size and membrane thickness of the membrane used in the calculation were measured under the conditions of temperature: 23° C. and relative humidity: 50% RH. The polymer electrolyte membrane in Examples is a membrane made of the polymer H or polymer H'. Therefore, the storage modulus and the softening temperature of the polymer electrolyte membrane measured in Examples are the same values as the storage modulus and the softening temperature measured by using the membrane made of the polymer H or polymer H'.

[Tq Value]

Using a flow tester (CFT-500A, manufactured by Shimadzu Corporation) equipped with a nozzle having a length of 1 mm and an inner diameter of 1 mm, the polymer F or polymer F' was melt-extruded, while changing the temperature under the condition of an extrusion pressure of 2.94 MPa (gauge pressure). The temperature (TQ value) at which the extrusion amount of the polymer F or polymer F' became 100 mm$^3$/sec was obtained. When the TQ value exceeded 300° C., the TQ value was obtained by extrapolating from the measured value of the extrusion amount of 300° C. or lower. The extrapolation was performed by a logarithmic approximation of the correlation of extrusion amount with respect to the reciprocal of absolute temperature. The higher the TQ value, the larger the molecular weight of the polymer.

[Conductivity]

A substrate on which 4-terminal electrodes are disposed at 5 mm intervals was brought into close contact with a polymer electrolyte membrane (membrane thickness: 25 μm) having a width of 5 mm, and by a known 4-terminal method, the resistance of the membrane of the polymer H or polymer H' was measured at AC: 10 kHz and voltage: 1 V under constant temperature and humidity conditions of temperature: 80° C. and relative humidity: 50%, and the conductivity was calculated. The standard size and membrane thickness of the membrane used in the calculation were measured under the conditions of temperature: 23° C. and relative humidity: 50% RH.

The polymer electrolyte membrane in Examples is a membrane made of the polymer H or polymer H'. Therefore, the conductivity of the polymer electrolyte membrane measured in Examples is the same value as the conductivity measured by using the membrane made of the polymer H or polymer H'.

[Hydrogen Gas Permeation Coefficient]

The hydrogen gas permeation coefficient of a polymer electrolyte membrane (membrane thickness 100 μm) was measured in accordance with JIS K 7126-2: 2006. As a measuring device, a gas permeability measuring device (GTR-100XFAG manufactured by GTR Tech Co., Ltd.) was used.

A polymer electrolyte membrane having an effective permeation area of 9.62 cm$^2$ was kept at 80° C., and on the first surface, hydrogen gas having a relative humidity of 10% was permitted to flow at 30 mL/min, and on the second surface, argon gas having the relative humidity adjusted to 10% was permitted to flow at 30 mL/min. The hydrogen gas permeating to the argon gas was detected by gas chromatography, and the permeation amount of hydrogen gas calculated by volume at 25° C. under 1 atm was obtained. Using the obtained hydrogen gas permeation amount, the permeability of the gas permeated per second per 1 cm$^2$ of the membrane area and the pressure difference of 1 cmHg of the permeated gas, was obtained, and the value converted to a membrane having a membrane thickness of 1 cm was taken as the hydrogen gas permeation coefficient. The standard size and membrane thickness of the membrane used in the calculation were measured under the conditions of temperature: 23° C. and relative humidity: 50% RH.

The polymer electrolyte membrane in Examples is a membrane made of the polymer H or polymer H'. Therefore, the hydrogen gas permeation coefficient of the polymer electrolyte membrane measured in Examples is the same value as the hydrogen gas permeation coefficient measured by using the membrane made of the polymer H or polymer H'.

Abbreviations

TFE: tetrafluoroethylene,
sPSVE: $CF_2=CFOCF_2CF_2SO_2F$,
PSAE: $CF_2=CFCF_2OCF_2CF_2SO_2F$,
PFtBPO: $(CF_3)_3COOC(CF_3)_3$,
IPP: $(CH_3)_2CHOC(O)OOC(O)OCH(CH_3)_2$,
HFC-52-13p: $CF_3(CF_2)_5H$,
HFE-347pc-f: $CF_3CH_2OCF_2CF_2H$,
HCFC-225cb: $CCIF_2CF_2CHCIF$,
HCFC-141b: $CH_3CCl_2F$.

Ex. 1

Ex. 1-1

Into a 2 L four-necked flask equipped with a stirrer, a condenser, a thermometer and a dropping funnel, 560 g of chlorosulfonic acid was charged under a nitrogen gas sealing. The flask was cooled in an ice bath, and a mixed solution of 139.5 g of compound 1-1 and 478.7 g of dichloromethane was added dropwise over 20 minutes, while keeping the internal temperature to be at most 20° C. Heat generation and gas generation were observed during the dropping. After completion of the dropping, the flask was set in an oil bath and the reaction was conducted for 7 hours, while keeping the internal temperature at from 30 to 40° C. The reaction proceeded with the generation of gas, and a white solid was precipitated. After the reaction, the pressure inside the flask was reduced and dichloromethane was distilled off. A yellowish white solid remained in the flask. When the solid was analyzed by $^1$H-NMR, it was confirmed that compound 2-1 was formed.

Formula 1-1                Formula 2-1

NMR spectrum of compound 2-1:
$^1$H-NMR (solvent: $D_2O$): 4.27 ppm (—$CH_2$—, 4H, s).
$^{13}$C-NMR (solvent: $D_2O$): 62.6 ppm (—$CH_2$—), 195.3 ppm (C=O).

Ex. 1-2

Compound 2-1 obtained in Ex. 1-1 was used as it was in the next reaction without being isolated. 2,049 g of thionyl chloride was added to the flask in Ex. 1-1. The flask was heated to 80° C. and refluxed for 15 hours. As the reaction proceeded, the reflux temperature increased from 52° C. to 72° C. Gas generation was confirmed during the reaction. The point at which all of compound 2-1 was dissolved and the gas generation stopped, was taken as the reaction end point. When the reaction solution was transferred to a 2 L separable flask and left to cool for 9 hours, while sealing the gas phase with nitrogen gas, a dark brown solid was precipitated in the separable flask. Unreacted thionyl chloride was removed by decantation. Toluene was added to wash the precipitated solid, and the toluene was removed again by decantation. Toluene washing was carried out for a total of 3 times, and the total amount of toluene used was 1,207 g. The precipitated solid was dried at 25° C. for 71 hours under a nitrogen gas stream. The dried solid was recovered and analyzed by $^1$H-NMR, and it was confirmed that 356.5 g of compound 3-1 having a purity of 96.2% was obtained. The yield based on compound 1-1 was 56.0%.

Formula 2-1                Formula 3-1

NMR spectrum of compound 3-1:
$^1$H-NMR: 5.20 ppm (—$CH_2$—, 4H, s).
$^{13}$C-NMR: 72.3 ppm (—$CH_2$—), 184.6 ppm (C=O).

Ex. 1-3

Into a 1 L four-necked flask equipped with a stirrer, a condenser and a thermometer, 90.0 g of compound 3-1 and 750 mL of acetonitrile were charged under a nitrogen gas sealing. The flask was cooled in an ice bath and 110.3 g of potassium hydrogen fluoride was added with stirring. The heat generation associated with the addition was slight. The ice bath was changed to a water bath, and the reaction was carried out for 62 hours, while maintaining the internal temperature at from 15 to 25° C. Along with the reaction, a fine white solid was formed. The reaction solution was transferred to a pressure filter, and unreacted potassium hydrogen fluoride and the product were separated by filtration. Acetonitrile was added to the filter, and the separated solid was washed until the filtrate became transparent, and the washing solution was recovered. Acetonitrile was distilled off by applying a filtrate and a washing solution to an evaporator. 950 mL of toluene was added to the solid remaining after drying, and the mixture was heated to 100° C. to dissolve the solid in toluene. The dissolved liquid was filtered by gravity filtration to remove undissolved components. When the filtrate was transferred to a 1 L separable flask and left to cool for 14 hours, while sealing the gas phase with nitrogen gas, light brown needle-like crystals were precipitated in the separable flask. The crystals were washed with toluene and dried at 25° C. for 30 hours under a nitrogen gas stream. When the dried solid was recovered and analyzed by $^1$H-NMR and $^{19}$F-NMR, it was confirmed that 58.1 g of compound 4-1 having a purity of 97.6% was obtained. The yield based on compound 3-1 was 72.3%.

Formula 3-1                Formula 4-1

NMR spectrum of compound 4-1:
$^1$H-NMR: 4.97 ppm (—$CH_2$—, 4H, d, J=3.1 Hz).
$^{19}$F-NMR: 62.4 ppm (—$SO_2F$, 2 F, t, J=3.1 Hz).
$^{13}$C-NMR: 60.7 ppm (—$CH_2$—), 184.9 ppm (C=O).

Ex. 1-4

Into a 200 mL nickel autoclave, 9.93 g of compound 4-1 and 89.7 g of acetonitrile were charged. The autoclave was cooled, nitrogen gas was fed at a flow rate of 6.7 L/hr, while maintaining the internal temperature to be from 0 to 5° C., and the reaction solution was bubbled for 1 hour. While maintaining the temperature of the reaction solution at from 0 to 5° C., a mixed gas of fluorine gas and nitrogen gas (mixing ratio=10.3 mol %/89.7 mol %) was introduced at a flow rate of 6.7 L/hr over 6 hours. Nitrogen gas was fed again at a flow rate of 6.7 L/hr, and the reaction solution was bubbled for 1 hour. 103.2 g of the reaction solution was recovered from the autoclave. When the reaction solution was quantitatively analyzed by $^{19}$F-NMR, it was confirmed that compound 5-1 was contained in an amount of 8.4 mass %. The reaction yield based on compound 4-1 was 66%.

Formula 4-1          Formula 5-1

NMR spectrum of compound 5-1:
$^{19}$F-NMR: −104.1 ppm (—CF$_2$—, 4F, s), 45.8 ppm (—SO$_2$F, 2F, s).

Ex. 1-5

Into a 200 mL nickel autoclave, 19.9 g of compound 4-1 and 85.6 g of acetonitrile were charged. The autoclave was cooled, nitrogen gas was fed at a flow rate of 6.7 L/hr, while maintaining the internal temperature to be from 0 to 5° C., and the reaction solution was bubbled for 1 hour. While maintaining the temperature of the reaction solution at from 0 to 5° C., a mixed gas of fluorine gas and nitrogen gas (mixing ratio=10.3 mol %/89.7 mol %) was introduced at a flow rate of 16.4 L/hr over 6.5 hours. Nitrogen gas was fed again at a flow rate of 6.7 L/hr, and the reaction solution was bubbled for 1 hour. 109.6 g of the reaction solution containing compound 5-1 was recovered from the autoclave.

Ex. 1-6

Into a 200 mL nickel autoclave, 20.1 g of compound 4-1 and 80.1 g of acetonitrile were charged. The autoclave was cooled, nitrogen gas was fed at a flow rate of 6.7 L/hr, while maintaining the internal temperature to be from 0 to 5° C., and the reaction solution was bubbled for 1 hour. While maintaining the temperature of the reaction solution at from 0 to 5° C., a mixed gas of fluorine gas and nitrogen gas (mixing ratio=20.0 mol %/80.0 mol %) was introduced at a flow rate of 8.4 L/hr for 6 hours. Nitrogen gas was fed again at a flow rate of 6.7 L/hr, and the reaction solution was bubbled for 1 hour. 107.1 g of the reaction solution containing compound 5-1 was recovered from the autoclave.

Ex. 1-7

Into a 50 mL four-necked flask equipped with a stirrer, a condenser, a thermometer and a dropping funnel, 1.65 g of potassium fluoride and 7.8 mL of diethylene glycol dimethyl ether (diglyme) were charged. The flask was cooled in an ice bath, stirred, and while maintaining the internal temperature at from 0 to 10° C., 8.43 g of the reaction solution obtained in Ex. 1-4 was added dropwise using a plastic syringe. Strong heat generation was confirmed, and it took 15 minutes for the dropping. After completion of the dropping, the ice bath was replaced with a water bath, and the reaction was carried out at from 15 to 20° C. for 1 hour. The mixture was cooled again in an ice bath, and 6.56 g of compound 6-1 was added dropwise from the dropping funnel, while maintaining the temperature of the reaction solution at from 0 to 10° C. After completion of the dropping, the ice bath was replaced with a water bath, and the reaction was conducted at from 20 to 25° C. for 3.5 hours. A by-product solid was removed from the reaction solution by suction filtration, and the filtrate was recovered. The filtered residual solid was washed with an appropriate amount of acetonitrile, and the washing liquid was mixed with the filtrate. When 37.1 g of the filtrate was quantitatively analyzed by $^{19}$F-NMR, it was confirmed that compound 7-1 was contained in an amount of 2.04 mass %. The reaction yield based on compound 4-1 was 46.6%.

Formula 6-1          Formula 5-1

Formula 7-1

NMR spectrum of compound 7-1:
$^{19}$F-NMR: −191.5 ppm (CF$_2$=CF—, 1F, ddt, J=116, 38, 14 Hz), −133.8 ppm (—O—CF—, 1F, tt, J=21.3, 6.1 Hz), −103.1 ppm (—CF$_2$—SO$_2$F, 4F, m), −101.5 ppm (CF$_2$=CF—, 1F, ddt, J=116, 49, 27 Hz), −87.6 ppm (CF$_2$=CF—, 1F, ddt, J=49, 38, 7 Hz), −67.5 ppm (—CF$_2$—O—, 2F, m), 46.8 ppm (—SO$_2$F, 2F, s).

Ex. 1-8

Into a 500 mL four-necked flask equipped with a stirrer, a condenser, a thermometer and a dropping funnel, 36.6 g of potassium fluoride and 125.6 g of acetonitrile were charged. The flask was cooled in an ice bath and stirred to keep the internal temperature to be from 0 to 10° C., and 79.8 g of the reaction solution obtained in Ex. 1-5 was added dropwise using a plastic dropping funnel. Strong heat generation was confirmed, and it took 23 minutes for the dropping. After completion of the dropping, the ice bath was replaced with a water bath, and the reaction was carried out at from 20 to 30° C. for 5.5 hours. The mixture was cooled again in an ice bath, and 146.0 g of compound 6-1 was added dropwise from the dropping funnel, while maintaining the temperature of the reaction solution to be from 0 to 10° C. After completion of the dropping, the ice bath was replaced with a water bath and the reaction was conducted at from 15 to 25° C. for 16 hours. Suction filtration was carried out in the same manner as in Ex. 1-7, and 412.3 g of the obtained filtrate was quantitatively analyzed by $^{19}$F-NMR, and it was confirmed that compound 7-1 was contained in an amount of 3.93 mass %. The reaction yield based on compound 4-1 was 55.9%. The filtrate was distilled under reduced pressure to isolate compound 7-1 as a fraction having a boiling point of 97.2° C./10 kPa. The gas chromatography purity was 98.0%.

Ex. 1-9

Into a 50 mL four-necked flask equipped with a stirrer, a condenser, a thermometer and a dropping funnel, 3.70 g of potassium fluoride and 10.9 g of acetonitrile were charged.

The flask was cooled in an ice bath, stirred, and 10.2 g of the reaction solution obtained in Ex. 1-6 was added dropwise using a plastic syringe, while keeping the internal temperature at from 0 to 10° C. Strong heat generation was confirmed, and it took 8 minutes for the dropping. After completion of the dropping, the ice bath was replaced with a water bath, and the reaction was carried out at from 20 to 30° C. for 3 hours. The mixture was cooled again in an ice bath, and 14.6 g of compound 6-1 was added dropwise from the dropping funnel, while maintaining the temperature of the reaction solution at from 0 to 10° C. After completion of the dropping, the ice bath was replaced with a water bath, and the reaction was carried out at from 15 to 25° C. for 17 hours. Suction filtration was performed in the same manner as in Ex. 1-7, and 55.9 g of the obtained filtrate was quantitatively analyzed by $^{19}$F-NMR, and it was confirmed that compound 7-1 was contained in an amount of 4.77 mass %. The reaction yield based on compound 4-1 was 69.6%. The reaction yield based on compound 1-1 (reaction yield in the entire monomer synthesis step) was 28.2%.

Ex. 2

Ex. 2-1

Into an autoclave (internal volume 100 mL, made of stainless steel), 35.0 g of compound 7-1 and 37.0 g of HFC-52-13p were put, cooled with liquid nitrogen, and degassed. The autoclave was heated in an oil bath until the internal temperature reached 100° C. The pressure at this time was 0.02 MPa (gauge pressure). TFE was introduced into the autoclave, and the pressure was set to be 0.32 MPa (gauge pressure). The TFE partial pressure was 0.30 MPa. A mixed solution of 76.0 mg of PFtBPO as a polymerization initiator, and 4.1 g of HFC-52-c13p, was injected into the autoclave. Furthermore, nitrogen gas was introduced from the injection line, and the injecting liquid in the injection line was completely pushed in. As a result of diluting TFE in the gas phase by this operation, the pressure increased to 0.60 MPa (gauge pressure). Polymerization was carried out by continuously adding TFE, while maintaining the pressure at 0.60 MPa (gauge pressure). When the amount of TFE added reached 10.29 g in 7.0 hours, the inside of the autoclave was cooled to stop the polymerization, and the gas in the system was purged. After the reaction solution was diluted with HFC-52-13p, HFE-347pc-f was added, and the polymer was precipitated and filtered. Then, the operation of stirring the polymer in HFC-52-13p and reprecipitating by HFE-347pc-f was repeated twice. By vacuum drying at 120° C., 12.9 g of polymer F-1 as a copolymer of TFE and compound 7-1, was obtained. The results are shown in Table 1. When HFC-52-13p and HFE-347pc-f used for precipitation were dried to dryness, 0.1 g of an oligomer component was extracted. That is, the oligomer content was at most 1 mass %.

Using the obtained polymer F-1, the above-mentioned various physical properties were measured. The results are shown in Table 1.

TABLE 1

|  | Ex. 2-1 |
|---|---|
| Reactor volume [mL] | 100 |
| Compound 7-1 [g] | 35.0 |
| HFC-52-13p [g] | 41.1 |
| Type of polymerization initiator | PFtBPO |

TABLE 1-continued

|  | Ex. 2-1 |
|---|---|
| Amount of polymerization initiator [mg] | 76.0 |
| Polymerization temperature [° C.] | 100 |
| TFE partial pressure [MPaG] | 0.30 |
| Polymerization pressure [MPaG] | 0.60 |
| Continuously added TFE [g] | 10.29 |
| Polymerization time [h] | 7.0 |
| Type of polymer F | F-1 |
| Yield of polymer F [g] | 12.9 |
| Compound 7-1 units [mol %] | 8.1 |
| TFE units [mol %] | 91.9 |
| Ion exchange capacity [milliequivalent/gram dry resin] | 1.27 |
| TQ value [° C.] | 294 |
| Productivity index (g/(100 g · h)] | 5.27 |

Ex. 3

Ex. 3-1

Using the polymer F-1 obtained in Ex. 2, membranes of the polymer H-1 (membrane thicknesses 25, 50, and 100 µm) were obtained by the following method.

The polymer F was press-molded at a temperature 10° C. higher than the TQ value or 260° C., whichever was lower, and 4 MPa (gauge pressure) to obtain a membrane of the polymer F. In an alkaline aqueous solution B (potassium hydroxide/dimethyl sulfoxide/water=15/30/55 (mass ratio)), the membrane of the polymer F was immersed for 16 hours at 80° C., to hydrolyze —SO$_2$F of the polymer F to convert it to —SO$_3$K. Further, the polymer membrane was immersed in a 3 mol/L hydrochloric acid aqueous solution at 50° C. for 30 minutes, and then immersed in ultrapure water at 80° C. for 30 minutes. The cycle of immersion in the hydrochloric acid aqueous solution and immersion in ultrapure water was carried out a total of 5 times to convert —SO$_3$K of the polymer to —SO$_3$H. Washing with ultrapure water was repeated until the pH of the water in which the polymer membrane was immersed became 7. The polymer membrane was sandwiched between filter papers and air-dried to obtain a polymer H membrane. The obtained polymer H membrane was used as a polymer electrolyte membrane, and the above-mentioned various physical property values were measured. The results are shown in Table 2.

In Table 2, "units A-1" means units obtained by converting groups represented by —SO$_2$F in the compound 7-1 units to —SO$_3$H.

TABLE 2

|  |  | Ex. 3-1 |
|---|---|---|
| Polymer F | Type | F-1 |
|  | TQ value [° C.] | 333 |
| Polymer H | Type | H-1 |
|  | TFE units [mol %] | 91.9 |
|  | Units A-1 [mol %] | 8.1 |
|  | Ion exchange capacity [milliequivalent/gram dry resin] | 1.27 |
|  | Storage modulus at 120° C. [MPa] | 149.3 |
|  | Conductivity [S/cm] | 0.054 |
|  | Softening temperature [° C.] | 161 |
|  | Hydrogen gas permeation coefficient [cm$^3$ · cm/(s · cm$^2$ · cmHg)] | $1.0 \times 10^{-9}$ |

Ex. 4

Ex. 4-1

Into a Hastelloy autoclave having an internal volume of 230 mL, 90.0 g of sPSVE, 1.00 g of HCFC-225cb and 90.5 mg of IPP were put, cooled with liquid nitrogen, and degassed. The temperature was raised to 40° C., TFE was introduced into the system, and the pressure was maintained at 0.90 MPa (gauge pressure). TFE was continuously added so that the pressure became constant at 0.90 MPa (gauge pressure). After 4.5 hours had passed and when the amount of TFE added reached 14.5 g, the autoclave was cooled, and the gas in the system was purged to terminate the reaction. The polymer solution was diluted with HCFC-225cb, then HCFC-141b was added for precipitation. After washing with HCFC-225cb and HCFC-141b, the mixture was dried to obtain 22.2 g of polymer F'-1 as a copolymer of TFE and PSVE. The results are shown in Table 3.

Ex. 4-2

Into an autoclave (internal volume 230 mL, made of stainless steel), 175.0 g of PSAE was put, cooled with liquid nitrogen, and degassed. The mixture was heated in an oil bath until the internal temperature reached 110° C., and TFE was introduced into the system to maintain the pressure at 0.27 MPa (gauge pressure).

A mixed solution of 55.3 mg of PFtBPO as a polymerization initiator and 8.45 g of HFC-52-13p was injected into the autoclave. Furthermore, nitrogen gas was introduced from the injection line, and injecting liquid in the injection line was completely pushed in. As a result of diluting TFE in the gas phase by this operation, the pressure increased to 0.68 MPa (gauge pressure). Polymerization was carried out by continuously adding TFE, while maintaining the pressure at 0.68 MPa (gauge pressure). When the amount of TFE added reached 11.25 g in 5.0 hours, the inside of the autoclave was cooled to stop the polymerization, and the gas in the system was purged. The reaction solution was diluted with HFC-52-13p, HFE-347pc-f was added, and the polymer was precipitated and filtered. Then, the operation of stirring the polymer in HFC-52-13p and reprecipitating by HFE-347pc-f was repeated twice. By vacuum drying at 120° C., polymer F'-2 as a copolymer of TFE and PSAE was obtained. The results are shown in Table 3.

TABLE 3

|  | Ex. 4-1 | Ex. 4-2 |
| --- | --- | --- |
| Reactor volume [mL] | 100 | 230 |
| Type of monomer having —SO$_2$F groups | SPSVE | PSAE |
| Content of monomer having —SO$_2$F groups | 90.0 | 175.0 |
| HCFC-225cb [g] | 1.00 | — |
| HFC-52-13p [g] | — | 8.45 |
| Type of polymerization initiator | IPP | PFtBPO |
| Amount of polymerization initiator [mg] | 90.5 | 55.3 |
| Polymerization temperature [° C.] | 40 | 110 |
| Pressure before dilution with nitrogen gas [MPaG] | — | 0.27 |
| Polymerization pressure [MPaG] | 0.90 | 0.68 |
| Continuously added TFE [g] | 14.5 | 11.25 |
| Polymerization time [h] | 4.5 | 5.0 |
| Type of polymer F' | F'-1 | F'-2 |
| Yield of polymer F' [g] | 22.2 | 18.8 |
| Monomer units having —SO$_2$F groups [mol %] | 16.1 | 17.0 |
| TFE units [mol %] | 83.9 | 83.0 |
| Ion exchange capacity [milliequivalent/gram dry resin] | 1.25 | 1.22 |
| TQ value [° C.] | 317 | 240 |
| Productivity index [g/(100 g · h)] | 5.48 | 2.15 |

Ex. 5

Ex. 5-1 to Ex. 5-2

Polymers F'-1 to F'-2 were treated in the same manner as in Ex. 3 to obtain membranes of polymers H'-1 to H'-2. The obtained membrane of polymer H' was used as a polymer electrolyte membrane, and the above-mentioned various physical property values were measured. The results are shown in Table 4.

TABLE 4

|  |  | Ex. 5-1 | Ex. 5-2 |
| --- | --- | --- | --- |
| Polymer F' | Type | F'-1 | F'-2 |
|  | TQ value [° C.] | 317 | 240 |
| Polymer H' | Type | H'-1 | H'-2 |
|  | TFE units [mol %] | 83.9 | 83.0 |
|  | Monomer units having —SO$_3$H groups [mol %] | 16.1 | 17.0 |
|  | Ion exchange capacity [milliequivalent/gram dry resin] | 1.25 | 1.22 |
|  | Storage modulus at 120° C. [MPa] | 65.7 | 13.9 |
|  | Conductivity [S/cm] | 0.071 | 0.058 |
|  | Softening temperature [° C.] | 130 | 117 |
|  | Hydrogen gas permeation coefficient [cm3.cm/(s · cm$^2$ · cmHg)] | $3.0 \times 10^{-9}$ | $3.0 \times 10^{-9}$ |

As shown in Table 2, since the electrolyte membrane (polymer electrolyte membrane) obtained by using the polymer H has a storage modulus of at least 100 MPa at 120° C., it can be said that the mechanical strength in a high temperature environment is excellent, as compared with the electrolyte obtained by using the polymer H' of which the storage modulus at 120° C. shown in Table 4 is less than the above value.

This application is a continuation of PCT Application No. PCT/JP2019/047943, filed on Dec. 6, 2019, which is based upon and claims the benefit of priority from Japanese Patent Application No. 2018-230213 filed on Dec. 7, 2018 and Japanese Patent Application No. 2019-036638 filed on Feb. 28, 2019. The contents of those applications are incorporated herein by reference in their entireties.

REFERENCE SYMBOLS

10: membrane electrode assembly
11: catalyst layer
12: gas diffusion layer
13: anode
14: cathode
15: polymer electrolyte membrane

What is claimed is:

1. A perfluoropolymer containing perfluoromonomer units, not substantially containing units having a halogen atom other than a fluorine atom, not substantially containing units having a ring structure, and having acid-type sulfonic acid groups, wherein:
   the perfluoromonomer units contain at least one type of units A selected from the group consisting of perfluorovinyl ether units and perfluoroallyl ether units;

the ion exchange capacity is from 0.9 to 1.4 milliequivalent/gram dry resin;
the storage modulus at 120° C. is at least 100 MPa; and
the perfluoromonomer units further comprise tetrafluoroethylene units.

2. The perfluoropolymer according to claim 1, of which the hydrogen gas permeation coefficient under the conditions of a temperature of 80° C. and a relative humidity of 10% is at most $2.7 \times 10^{-9}$ cm$^3$·cm/(s·cm$^2$·cmHg).

3. The perfluoropolymer according to claim 1, which is a perfluoropolymer obtainable by converting precursor groups of a precursor polymer in which the acid-type sulfonic acid groups are in the form of the precursor groups, into the acid-type sulfonic acid groups, wherein the TQ value of the precursor polymer is at least 220° C.

4. The perfluoropolymer according to claim 1, wherein the content of units A is from 4 to 19 mol % to all units in the perfluoropolymer.

5. The perfluoropolymer according to claim 1, wherein the perfluoromonomer units comprise perfluoroallyl ether units represented by the formula (A-1):

where in the formula A-1, $R^{F1}$ and $R^{F2}$ are each independently a $C_{1-3}$ perfluoroalkylene group.

6. A liquid composition comprising the perfluoropolymer as defined in claim 1 and a liquid medium.

7. A polymer electrolyte membrane comprising the perfluoropolymer as defined in claim 1.

8. The polymer electrolyte membrane according to claim 7, which further contains a reinforcing material.

9. A membrane electrode assembly comprising an anode having a catalyst layer containing a catalyst and a polymer having ion exchange groups, a cathode having a catalyst layer containing a catalyst and a polymer having ion exchange groups, and the polymer electrolyte membrane as defined in claim 7, disposed between the anode and the cathode.

10. The membrane electrode assembly according to claim 9, wherein at least one of the polymer having ion exchange groups contained in the anode and the polymer having ion exchange groups contained in the cathode, is a perfluoropolymer which is a perfluoropolymer containing perfluoromonomer units, not substantially containing units having halogen atoms other than fluorine atoms, not substantially containing units having a ring structure, and having acid-type sulfonic acid groups, wherein the perfluoromonomer units contain at least one type of units A selected from the group consisting of perfluorovinyl ether units and perfluoroallyl ether units, the ion exchange capacity is from 0.9 to 1.4 milliequivalent/gram dry resin, and the storage modulus at 120° C. is at least 100 MPa.

11. A polymer electrolyte water electrolyzer comprising the membrane electrode assembly as defined in claim 9.

* * * * *